Oct. 10, 1961 E. W. TAYLOR ET AL 3,003,413
FILM PRINTING PLATE AND METHOD OF MANUFACTURE
Filed March 12, 1957
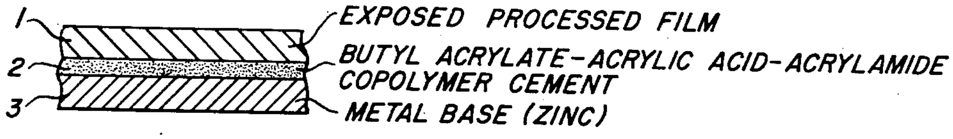
ERLE W. TAYLOR
HENRY C. STAEHLE
INVENTORS
BY Daniel I. Mayne,
Harold N. Powell
ATTORNEYS 3,003,413

FILM PRINTING PLATE AND METHOD OF MANUFACTURE

Erle W. Taylor and Henry C. Staehle, Rochester, N.Y., assignors to Eastman Kodak Company, Rochester, N.Y., a corporation of New Jersey Filed Mar. 12, 1957, Ser. No. 645,565
9 Claims. (Cl. 101—149.2)

This invention relates to a printing plate. More particularly this invention concerns a film-containing printing plate which includes in its make-up a metal element.

Photolithographic printing plates made from flexible photographic film are known in the art. For example, Yackel and Amering U.S. Patent No. 2,607,683 describes a photolithographic printing plate and its method of manufacture from cellulose ester film base material. Kenyon and Cathcart U.S. Patent No. 2,568,503 also describes film-type printing plate which employs a flexible film support in its make-up. Such products, while useful for many purposes and under various circumstances, since by their very nature being comprised of film base in their make-up, may in use on printing presses under certain conditions be subject to tearing, elongation or the like damage. However, in order to obtain a right-reading printing plate it is desirable to use the flexible film base type of material because exposure may be made through the support side thereof.

In the last-mentioned patent my coworkers have referred to the bonding of sensitive film to metal foil for providing improved dimensional stability and other advantages. In the present invention we likewise propose bonding the film to metal for obtaining improved dimensional stability and certain additional specific advantages which will be noted from the description hereinafter set forth.

It is apparent, therefore, that the provision of a film-type printing plate which has high tear strength, improved dimensional stability and the like advantages, but which still permits the removal of the film from the metal base, represents a highly desirable result.

This invention has for one object to provide a film-containing printing plate which has improved properties. A particular object is to provide a film-containing printing plate which exhibits improved dimensional stability, high tear strength and particular utility for wear when mounted in a press. Still another object is to provide a product of the class described which is comprised of a metal base carrying a particular type of adhesive, which adhesive adheres to the film printing member in a relatively permanent manner. Still another object is to provide a new film-containing printing plate of the class described which plate may be readily disassembled by means of solvent and the film component recovered. Other objects will appear hereinafter.

In the photolithographic printing plate art, and as described in the patents aforementioned, there are instances where it may be desired to use the exposed and developed film more or less as is for printing. However, as indicated, in other instances to eliminate undesired elongation of the film or to prevent tearing, or for the like reasons, it may be desirable to modify the film for rendering it useful under such other and usually more drastic conditions.

We have found that exposed and developed film such as illustrated by Patent 2,607,683, may be adhered to a metal sheet by certain acrylic adhesives. The resultant product comprising the film for printing purposes is adhered in a sufficiently strong manner so that when employed in a printing press it successfully resists tearing, undue elongation or other deformation. However, by employing the adhesive and procedure of the present invention, the film component may, if desired, be removed from the metal plate, the plate used for receiving other Lithoplate film or the film which is removed used for other purposes.

For a more complete understanding of our invention reference may be made to the attached drawing in which the single figure is a semi-diagrammatic cross-sectional view illustrating a product in accordance with the present invention. For clarity the various parts shown in the attached drawing are shown on an enlarged scale.

In the drawing 1 is the Lithoplate film of the type referred to in the patents above-mentioned. In other words, this film has been exposed through its support, developed or otherwise suitably processed to give a film product which would be suitable for photolithographic purposes. This film product is bonded by adhesive 2 to a metal base 3. This metal base preferably comprises a thin sheet of grained zinc such as is used in the lithographic industry.

The bonding medium 2 just referred to, and as will be described in detail hereinafter, is of a particular composition. This particular composition permits the obtaining of a secure bond between the film 1 and the metal base 3 in a relatively simple manner. This bond obtained by the adhesive 2 is sufficiently permanent that it is not affected by the fountain solutions usually used on a lithographic press. However, this special bond in accordance with the present invention can be caused to disunite by aqueous treatment for a period of time so that the film member 1 may be peeled from the metal plate thereby permitting the recovery of both elements for reuse or different use.

The following will describe the preparation of our acrylic adhesive material 2. Into a two-liter, round-bottomed flask fitted with an efficient high-capacity reflux condenser were placed 576 grams of butyl acrylate, 108 grams of acrylic acid, 600 ml. of p-dioxane, and 3 grams azobisisobutyronitrile. The solution was heated 2 hours in a 60° C. bath. There was an induction period of 35 minutes, after which the reaction became very vigorous for 5 minutes, then proceeded quietly for the remainder of the heating period. The polymer was precipitated in distilled water, then steamed to remove the residual monomer and solvent. The sample was then dissolved in sufficient 2.8 percent ammonium hydroxide to give a 22.6 percent solution.

Another example of preparing an adhesive which may be used in the present invention will be set forth. The following materials were added to a 5 l. flask equipped with 2 dropping funnels, a thermometer set to read liquid temperatures, and a mechanical agitator:

2800 ml. distilled water
13 g. oleoyl methyl taurine
4.5 g. potassium persulfate and heated on a steam bath. When the temperature of the liquid had reached 80° C., a solution of 5 g. of oleoyl methyl taurine in 800 ml. distilled water was added dropwise through one of the funnels. At the same time and at the same rate, a mixture of 716 g. n-butyl acrylate and 180 g. acrylic acid was added dropwise through the other funnel. These two additions were made at such a rate that both were completed in 55 minutes. During this time, the reaction temperature was maintained between 80–82° C. and for 40 minutes thereafter. The reaction mixture was then cooled to room temperature and filtered through a coarse filter bag. By analysis gravimetrically, the white translucent hydrosol contained 19.1% solids from a theoretical of 20.0% solids. To about 100 cc. of the product just described, there was added 10 cc. of 10 percent ammonium hydroxide. The addition of the ammonia converts part of the dispersed polyacrylic acid into the water soluble ammonium salt which increases the viscosity of the hydrosol so that it can be satisfactorily coated. A point to note is the fact that a solution of the polymer having the same solids content as this partially solubilized hydrosol would be so thick and viscous that it would be difficult to coat. Diluted to the same viscosity, its solids content would be so low as to require very heavy application and correspondingly long drying time.

A still further understanding of our invention will be had from a consideration of the following specific examples which are set forth for illustrating certain of our preferred embodiments for bonding printing film to metal plate.

*Example I*

An acrylic adhesive solution prepared as above described was diluted with approximately 10% water to obtain a coating solution of moderate viscosity. This adhesive coating solution was poured onto the center of a zinc plate which had previously been thoroughly cleaned and was still wet. The plate was placed on a whirler. The whirler was started and further adhesive coating in accordance with the present invention poured onto the plate in an outwardly traveling spiral so that the entire plate was covered with a uniform and comparatively thick layer of the adhesive coating of the present invention. With warm air this required approximately 30 minutes to dry. The lithoplate film which had been previously exposed and processed was then positioned and temporarily fastened with adhesive tape on the two corners to the aforementioned coated zinc plate. This combination of the temporarily fastened film and the coated zinc plate was then placed between the rolls of a wringer. A solution of approximately 50 cc. of the above-described polymeric adhesive to which 10 cc. of water and 100 g. of acrylamide had been added was then applied in the form of a bead to cement the two surfaces together. The solution just mentioned was in a slightly warm condition, say at a temperature of about 40° C. for maintaining the acrylamide in relatively complete solution. The passage of the aforementioned combination through the wringer rolls which were set to apply moderate pressure forced the film member against the coated metal base member giving a good union and squeezing out excess adhesive as well as any air bubbles.

After letting the combination plate stand for about ten minutes so that the adhesive layer had an opportunity to set to some extent, the combination plate was mounted on the web press in a printing plant. It operated under substantially commercial conditions and without tearing or other difficulties to print an entire run of several thousand copies of a paper.

*Example II*

In accordance with this example the lithoplate film used was as follows:

A cellulose triacetate film support consisting of a 0.0055-inch thick cellulose triacetate containing about 42.5% acetyl was coated with a sensitive layer made as follows:

An emulsion was prepared by pouring streams of aqueous solutions of silver nitrate and 5% excess alkali metal halide into an aqueous gelatin solution at 50° C. over a period of 5 minutes and then cooling to 40° C. One liter of the silver halide emulsion thus obtained containing the equivalent of 40 grams of silver and 70 grams of gelatin was combined with 800 grams of an aqueous dispersion of acrylate resin, e.g., polyethylacrylate.

After coating the sensitive composition on 800 square feet of the film support, the coated layer was dried and could be exposed either to a positive or a negative image to obtain a positive or negative result.

Exposure to a positive image was made by exposing under a line-positive or screened halftone negative to light from a 100-watt lamp at 30 inches for one second. The film was then developed for 20 seconds at room temperature in a tanning developer of the following composition:

| | Grams |
|---|---|
| A. Pyrogallol | 20 |
| N-methyl-p-aminophenol sulfate | 12 |
| Potassium bromide | 8 |
| Water to 1 liter. | |
| B. Sodium carbonate, des | 360 |
| Sodium sulfite | 100 |
| Water to 2 liters. | |

For use, 1 to 2 parts of B is mixed with 1 part of A to obtain the tanning developer solution.

Following development, the film was immersed in a 5% acetic acid bath for a short time, then treated with water at 104° F. to swell the exposed region, then squeegeed and dried. The film was then immersed for 3 minutes at 104° F. in a hydrolyzing solution of the following composition:

| | |
|---|---|
| Sodium hydroxide ____ grams | 10 |
| Ethyl alcohol (95%) ____ do | 80 |
| Water ____ cc | 120 |

After hydrolyzing, the film was removed from the hydrolyzing bath, rinsed in water and the resist was then removed with toluene. The plate which resulted had hydrolyzed areas where the sensitive areas had been exposed which areas repelled ink, and unhydrolyzed areas which attracted ink, when the plate was wetted with a greasy printing ink.

Where the reverse effect is desired as in the reproduction of microfile negatives, the film is treated after exposure in a developer of the following composition:

| | Grams |
|---|---|
| Hydroquinone | 45 |
| Sodium sulfite, des | 90 |
| Sodium hydroxide | 37 |
| Potassium bromide | 30 |
| Sodium thiocyanate | 1 |
| Water to 1 liter. | |

This developer forms a negative image, and after a light flash the film was developed in the tanning developer and given the further treatment described above.

Another method of producing a positive plate from a negative original consists in using a non-tanning first developer containing an active gelatin hardener, followed by a hydrogen peroxide etch treatment and then hydrolyzing the areas of the support laid bare by etching. This process is as follows:

After exposure to the negative image as before, the film is developed for one minute at 70° F. in a developer of the following composition:

| | Grams |
|---|---|
| N-methyl-p-aminophenol sulfate | 3.1 |
| Hydroquinone | 12 |
| Sodium sulfite, des | 45 |
| Sodium carbonate (monohydrate) | 80 |
| Potassium bromide | 1.9 |
| $\beta$-methyl glutaraldehyde | 15 |
| Water to 1 liter. | |

After a 1 minute wash in water at 70° F. the film was then immersed for 2 minutes at 70° F. with agitation in a bath of the following composition:

| | Grams |
|---|---|
| A. Cupric sulfate | 120 |
| Citric acid | 150 |
| Potassium bromide | 7.5 |
| Water to 1 liter. | |
| B. Hydrogen peroxide 3% solution. | |

For use, mix equal parts of A and B.

After a 2-minute wash in water at 118° F., the film was treated in the sodium hydroxide-ethyl alcohol hydrolyzing bath described above for 3 minutes at 118° F., treated in a dilute acetic acid stop bath for 1 minute, washed and the resist layer removed with toluene as before.

In a manner comparable to Example I, approximately the same type and amount of adhesive coating was placed on a zinc plate and the plate whirled to obtain dispersion of the coating. The lithoplate film just described in detail was then attached to the coated plate as described in Example I. After the adhesive set up a few minutes, the printing plate was tested and found to give a plate which would withstand operations on a press without undue stretching or deformation.

*Example III*

In this example there was used the same acrylic adhesive for attaching the film as described above but a type of metal plate, different from a zinc plate, was studied. That is, in place of the zinc plate described in Examples I and II, there was substituted grained aluminum and smooth aluminum. The thickness of the aluminum sheets may be between .003" and 0.20". The acrylic adhesive of the present invention permitted the adherence of the printing film to aluminum base in a satisfactory manner.

We have further found that it is possible to reuse the coated metal. That is, if a laminated plate is immersed in water for an eight-hour period or longer, the original lithoplate film may be readily peeled off leaving the original resin layer firmly affixed to the metal. This may then be used for laminating a new lithoplate film utilizing the bead application technique with the acrylamide cement in the same way as one would for newly coated metal.

*Example IV*

In accordance with this example, the particular exposed processed flexible film which was adhered to the metal base was somewhat different than in the preceding examples. That is, there was employed a type of product known as a solarized film. This type of product is obtained in the following manner. The film used was generally in accordance with the type described in the aforementioned Patent 2,607,683. As ordinarily used, an exposure to a positive either in a camera or by contact results in a printing element which will yield a positive print on the press. However, in this example, the film was exposed to an amount of light which would normally give complete tanning over all. It was then re-exposed under a negative to an amount of light approximately 100 or more times than the light required for fogging with the result that the emulsion becomes solarized. Upon development those areas which have been strongly exposed will not yield metallic silver and hence, no tanning takes place.

By virtue of this solarization effect, it is thus possible to make positive prints from a negative, handling the material in ordinary room light and making the exposure by photoflood or arc illumination. Furthermore, the quality of the image formation is such that it is possible to produce good halftone reproductions from a continuous tone negative by printing through an appropriate contact screen in making the exposure. Also it is possible to expose part of the printing plate to a positive in the conventional way as, for example, in a camera and then to flash the other part and re-expose to a negative using much stronger illumination, meanwhile, of course, masking off the original part exposed in the camera. By the procedures described in this example it is, therefore, possible to print from both positive copy and negative copy onto the same printing plate.

The exposed processed flexible film in this example which had been subjected to a solarization treatment as above described was adhered to a grained zinc sheet, substantially exactly as in Example I above. That is, the grained zinc sheet had applied thereto a coating of the acrylic adhesive described in Example I. The solarized film element was firmly positioned in place on the zinc plate carrying the adhesive. After the adhesive had set up for a period, the plate was then ready for use in a conventional press and was able to withstand long runs without the film element becoming deformed or detaching from the plate. On the other hand, after use in the press the film element may be detached from the metal base by soaking the printing plate overnight in water. In this manner the film element after a detaching and drying lends itself to more convenient storage in a file without the bulk of the metal element being present.

It is believed apparent from the foregoing examples that by the present invention a large variety of different types of exposed processed flexible film elements may be adhered to metal plates or sheets thereby extending the usefulness of various film elements for printing purposes.

We have further found that the film elements in addition to being of the type described above may be subjected to various specialized treatments without preventing their use in the present invention or their use as printing elements. For example, we have found that the lithoplate film as described above may be given a treatment with a Congo red solution. In more detail this solution is made up of approximately 1 gram of Congo red, 10 cc. of water, and 2 cc. of a liquid comprised of 3 parts of ethylene glycol which contains about 1 part of a surface active agent. A surface active agent such as Triton X100 is a satisfactory agent. This surface active agent is obtainable commercially and is indicated to be an alkyl aryl polyglycol ether compound.

The application of the solution just mentioned to the lithoplate film will, when dry, form a deep red transparent layer having a metallic lustre on the processed lithoplate film. This layer may be removed image-wise from the unhydrolyzed areas of the plate by swabbing with a near solvent for the cellulose-acetate.

In further detail, the Congo red solution was applied with a wiping pad made of cotton. Upon drying, the image was lightly wiped with methyl isobutyl ketone which removed the dye layer from the areas which would normally carry ink on the press. This effectively converted the lithoplate film into a photographic line negative having excellent sharpness and density to actinic light. Since Congo red is a water soluble dye the entire negative image may readily be removed with water. We have found that such a specialized application as just described for removal of the dye in no way interferes with the normal printing quality of the lithoprint film.

In some instances it may be desirable to examine the lithoplate film before using it in an actual printing operation. In other words one may wish to evaluate the processed lithoprint image before using the film for printing and without going through the operation of forming the printing plate and using it in a press. One way of accomplishing this is to apply to the processed lithoplate film a material known in the trade as developing ink. This material comprises an emulsion of methyl isobutyl ketone, or a similar solvent, and water, together with an orange dye or a hydrophobic pigment. The application of this liquid to the film yields an image of excellent contrast and sharpness thereby revealing to a substantial degree the exact printing characteristics of the plate when run on the press. The image so formed in no way interferes with the normal printing characteristics of the lithoplate film used in the present invention.

It is believed apparent from the foregoing that our invention is not limited to a particular lithoplate film. One the other hand, a large variety of lithoplate films treated in various ways may be used in the present invention. Other modifications may be made in our invention as will be described below.

In place of whirling, the coating as described in the above examples may be applied by a coating hopper onto a continuous strip of metal.

In place of running the combination of elements through wringer rolls to press the film onto the coated metal base, this can be accomplished by a hand roller operation or by a continuous machine operation where the lithoplate film is exposed and processed as a long strip of film.

As shown by the several examples above, while the bonding of the film to the metal base plate in accordance with the present invention was sufficiently strong to withstand operation in a commerical printing press for printing several thousand copies of printed matter, the bond was not such that the film could not be removed from the metal base. That is, by soaking the combination plate in an aqueous solution overnight, the lithoplate film component could be readily stripped from the metal base without damage to the film. This is advantageous for permitting the filing of the film portion without the complications of the bulkiness and weight of the metal plate. Also, this permits the use of the metal plate for another film for different printing.

While ammonium hydroxide is used in most instances to solubilize the polyacrylic acid component of the resin, other monovalent alkalies such as sodium carbonate, potassium hydroxide and the like may be used.

It is apparent from the foregoing that we have provided a relatively simple and economical product and procedure whereby lithoplate film may be used under more drastic conditions such as relatively long runs in commercial presses.

We claim:

1. As an article of manufacture a lithographic type printing plate comprised of a metal base, an adhesive coating on said base, said coating comprising acrylamide monomer and an acrylic ester-acrylic acid copolymer, and an exposed, processed flexible film adhered to said adhesive coating.

2. As an article of manufacture a printing plate comprised of a grained zinc base, an adhesive coating on said base, said coating comprising acrylamide monomer and a butyl acrylate-acrylic acid copolymer, and an exposed, processed cellulosic base film adhered to said adhesive coating.

3. As a new article of manufacture a lithographic type printing plate comprised of a metal base, an acrylic adhesive coating comprised of acrylamide monomer and a butyl acrylate-acrylic acid copolymer on said base and an exposed, processed flexible film adhered to said adhesive coating, said acrylic coating being capable of bonding said film to said metal base sufficiently strongly to withstand printing press use, yet said coating being capable of detachment by solvent action without substantial damage to said film.

4. The process of detaching a lithoplate film bonded to a metal base by means of an adhesive comprised of acrylamide monomer and a butyl acrylate-acrylic acid copolymer, which comprises immersing the entire combination in an aqueous solution for a period of several hours, thereafter peeling the film layer from the metal base.

5. As an article of manufacture a lithographic type printing plate comprised of an aluminum base and adhesive coating on said base, said coating comprising acrylamide monomer and a butyl acrylate-acrylic acid copolymer and an exposed processed flexible film adhered to said adhesive coating.

6. An article of manufacture in accordance with claim 1 wherein the exposed processed flexible film has been solarized.

7. As a new article of manufacture, a lithographic type printing plate comprised of a metal base from the group of metals consisting of zinc and aluminum, an acrylic adhesive coating on said metal base and an exposed processed flexible cellulose ester film adhered to said adhesive coating, said adhesive coating and the adherence being characterized in that the coating is comprised of acrylamide monomer and a butyl acrylate-acrylic acid copolymer and the adherence of the flexible film to said metal base is sufficiently strong to withstand printing press use, yet said coating is capable of detachment by solvent action without substantial damage to said flexible film.

8. An article of manufacture in accordance with claim 7 wherein the flexible cellulose ester film is comprised of cellulose acetate having an acetyl content of about 42.5%.

9. An article of manufacture in accordance with claim 7 wherein the exposed flexible film has been solarized.

References Cited in the file of this patent

UNITED STATES PATENTS

| | | |
|---|---|---|
| 937,391 | Thoma | Oct. 19, 1909 |
| 2,464,826 | Neher et al. | Mar. 22, 1949 |
| 2,476,527 | Barnes et al. | July 19, 1949 |
| 2,494,053 | Mitson et al. | Jan. 10, 1950 |
| 2,607,683 | Yackel et al. | Aug. 19, 1952 |
| 2,608,504 | Meyer et al. | Aug. 26, 1952 |
| 2,632,725 | Marks et al. | Mar. 24, 1953 |
| 2,666,044 | Catlin | Jan. 12, 1954 |
| 2,694,639 | Nadeau et al. | Nov. 16, 1954 |
| 2,714,066 | Jewett et al. | July 26, 1955 |
| 2,732,324 | Morris | Jan. 24, 1956 |
| 2,811,494 | Smith et al. | Oct. 29, 1957 |
| 2,828,435 | Hoyt | Mar. 25, 1958 |

OTHER REFERENCES

"The Theory of the Photographic Process" by C. E. K. Mees, published by The Macmillan Company, New York, copyright 1954, chapter 7 Solarization, pages 243–297.